United States Patent Office 3,000,794
Patented Sept. 19, 1961

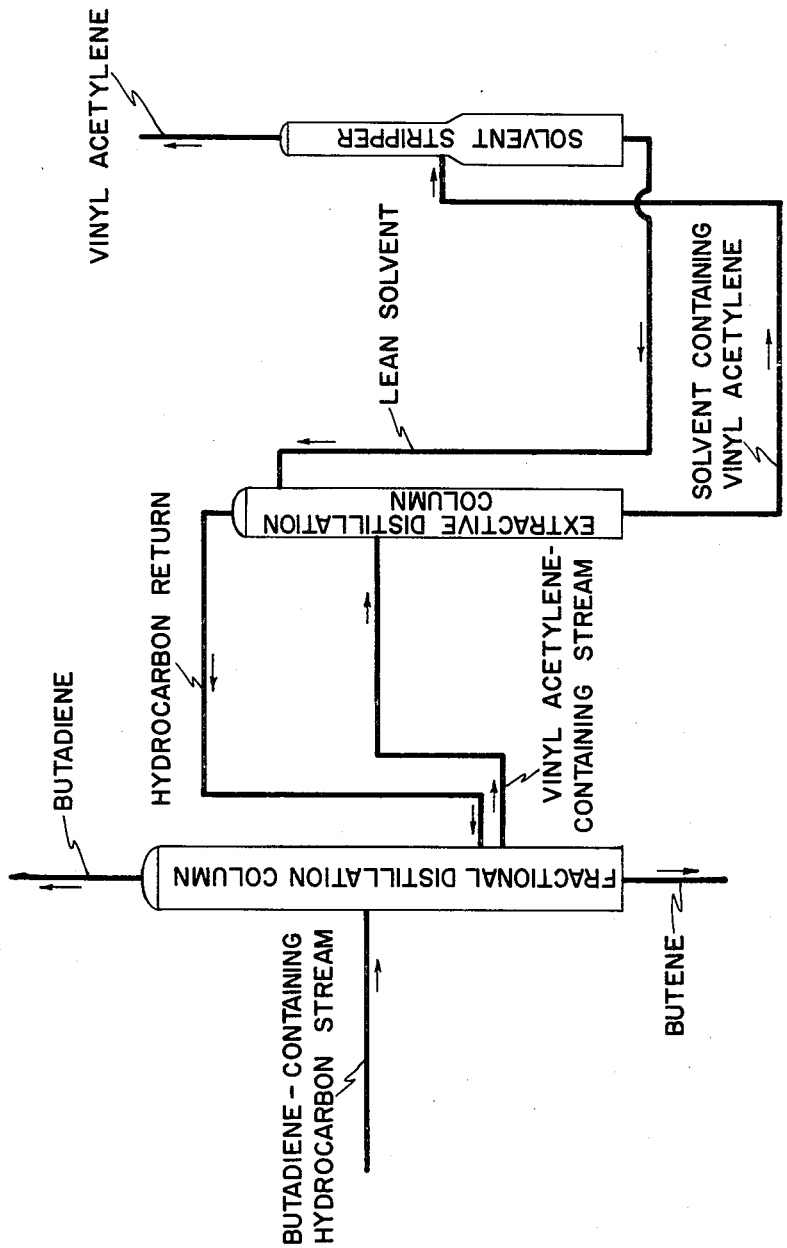

3,000,794
EXTRACTIVE DISTILLATION OF VINYL ACETY-
LENE IN THE PURIFICATION OF BUTADIENE
Lloyd D. Tschopp, Houston, Tex., assignor to Petro-Tex
Chemical Corporation, Houston, Tex., a corporation
of Delaware
Filed May 19, 1958, Ser. No. 735,970
10 Claims. (Cl. 202—39.5)

This invention relates to a method for separating vinyl acetylene from butadiene and relates more particularly to an improved method for the preparation of high purity butadiene containing minimum amounts of vinyl acetylene by a novel process involving extractive distillation to remove vinyl acetylene from a side stream from a final fractional distillation zone employed to provide high purity butadiene.

Butadiene is prepared commercially by dehydrogenation of butane or butylenes. The dehydrogenation products contain other hydrocarbons in addition to butadiene. To obtain high purity butadiene, the dehydrogenated product is normally fractionated to concentrate the butadiene and the resulting product is either passed through a cuprous ammonium acetate solution wherein the butadiene is dissolved or is treated to extractive distillation with a solvent such as furfural which dissolves butadiene, and the butadiene is then desorbed from these media. In most processes, particularly when extractive distillation is employed, the desorbed material is fractionally distilled to produce the desired high purity butadiene. Butadiene which is purified by extractive distillation, as with furfural, and a final fractionation normally contains vinyl acetylene as an impurity in the final high purity product. It has been quite difficult, on a commercial scale, to produce high purity butadiene without carrying objectionable quantities of vinyl acetylene along with the butadiene. Many processes for reducing the vinyl acetylene content of high purity butadiene have been proposed, but they are generally complex, often employing catalyzed reactions to remove vinyl acetylene, require handling large volumes of materials and in many of the proposed processes butadiene losses are excessive. Generally, the proposed processes have not been completely satisfactory in accomplishing the desired results; that is, provision of butadiene containing minimum amounts of vinyl acetylene.

It is well known that vinyl acetylene is an objectionable impurity in butadiene, particularly when the butadiene is to be used polymerization processes to make synthetic rubbers, such as copolymers of butadiene and styrene, and butadiene and acrylonitrile. Further, it is the practice in the synthetic rubber industry to conduct the reaction of butadiene and styrene to less than complete conversion, often only 60%, of monomers to polymer, and in such cases, it is economically essential that the unreacted butadiene be recovered and recycled in the polymerization processes. When the butadiene initially employed contains vinyl acetylene in amounts at the allowable maximum, the vinyl acetylene in the recycled butadiene builds up quite rapidly with subsequent additional and accelerated deleterious effects on the polymerization reactions and products.

Accordingly, it is an object of this invention to provide an improved economical process for preparing high purity butadiene containing minimum amounts of vinyl acetylene with a minimum loss of butadiene. Another object is to provide a novel process for removing vinyl acetylene from butadiene. Other objects and advantages of the invention will be apparent from the description thereof which follows.

As pointed out above, complete removal of vinyl acetylene from butadiene-containing streams is particularly difficult in the case of butadiene-containing streams purified by fractional distillation, extractive distillation and a final fractionation to obtain high purity butadiene. Even under the best operating conditions, several hundredths of a percent, often more than one-tenth percent of vinyl acetylene will be found in the final high purity butadiene product which normally will have a purity of greater than 98.5%. Specifications for polymerization grade butadiene include a limitation of 0.1% by weight maximum of acetylene as a compromise between requirements of the user and economical purification operations by the producer. Butadiene containing only a few parts per million vinyl acetylene is particularly desirable.

This invention now provides a novel, efficient and inexpensive method for reducing the vinyl acetylene content of polymerization grade butadiene to only a few parts per million. This reduction in vinyl acetylene content is accomplished by extractive distillation of a side stream from a final fractional distillation zone of a portion of the material in the distillation zone having vinyl acetylenes concentrated therein in a polar solvent such as furfural, acetone, acetonitrile and the like, with little loss of butadiene.

In the final fractional distillation of butadiene-containing streams, the vinyl acetylenes have a tendency to concentrate in the lower portion of the distillation column or zone. I have now found that when a side stream is taken from this zone at a point in the column or zone below which the concentration of vinyl acetylenes begin to increase, and this side stream is extractively distilled in a column in the presence of a solvent for the vinyl acetylene, and the overhead containing less vinyl acetylene than the feed side stream is returned to the fractional distillation column, that butadiene of high purity and with only traces, a few parts per million of acetylene, will be found in the final butadiene product from the fractional distillation column.

The accompanying drawing illustrates one method for producing high purity butadiene containing minimum amounts of vinyl acetylene according to this invention. The butadiene containing hydrocarbon stream which is contaminated with vinyl acetylene is fed to the fractional distillation column. From this column the butenes together with some of the vinyl acetylene comes off as bottoms. A side stream is taken off from a section of the column wherein the vinyl acetylenes are concentrated. This vinyl acetylene containing stream is then extractively distilled in the second column and the purified hydrocarbon overhead is returned to the fractional distillation column. The high purity butadiene is taken off as an overhead from the fractional distillation column.

In the vinyl acetylene solvent column, as disclosed herein, the order of relative volatilities of the various components from the side stream of the fractional distillation column are so altered in the presence of a polar solvent that the butene-2 and butadiene are distilled off preferentially ahead of vinyl acetylene which is retained in the polar solvent. The relative volatility of the butadiene in respect to vinyl acetylene is sufficiently high such that practical use of extractive distillation can be made. The retention of vinyl acetylene in this column and continuous removal thereof from a cycling side stream from the fractional distillation column or zone results in pure butadiene overhead product therefrom containing at most only a few parts per million of vinyl acetylene.

The relative volatility of butadiene/vinyl acetylene is an important factor to the success of the present invention. The relative volatility of butadiene to vinyl acetylene was determined at 120° F. in a solvent consisting of furfural containing 3% water. The hydrocarbon mixture tested contained about 50% butadiene and 44 to 48% butene-2 and vinyl acetylene. In the case of a butadiene-containing hydrocarbon a sample having two volume percent vinyl acetylene, the total hydrocarbon concentration in the solvent being 10%, the relative volatility was 2.4; and at a concentration of 20% hydrocarbon in solvent the relative volatility was 2.35. When the vinyl acetylene content of the hydrocarbon mixture was 6.0 volume percent, the relative volatility at a concentration of hydrocarbons in solvent of 10% was 2.2; and at a concentration of hydrocarbon in solvent of 20 volume percent, the relative volatility was 2.16. It is evident from these data that the relative volatilities are in a range to make possible efficient separation of vinyl acetylene from butadiene by extractive distillation in a furfural-water solvent.

In the practice of the invention, that point in the fractional distillation column at which the concentration of vinyl acetylene begins to increase is established, and the point of take off for the butadiene side stream containing higher concentrations of vinyl acetylene will be established below this point. This may be considered as the vinyl acetylene zone. In the usual operations, the vinyl acetylene concentration will be from 3 to 8% on the tray of highest concentration, but may go as high as 25%. It will be understood, of course, that in the practice of this invention, once the side stream of butadiene containing high concentrations of vinyl acetylene is being withdrawn from the fractionation zone, that the concentration of vinyl acetylenes will be decreased throughout the fractional distillation column and more markedly in the lower third of the column. Actual operating conditions, of course, will dictate, to some extent, the point at which the side stream will be drawn off, and this point can be readily established by the man skilled in the art, both by practice and calculation. The butadiene overhead from the vinyl acetylene extractive distillation column normally will be returned to the fractional distillation column, preferably but not necessarily close to the withdrawal point and in the same physical condition on withdrawn; i.e., if gas is withdrawn, gas would normally be returned, so as to affect little change in operating and equilibrium conditions in the column.

The vinyl acetylene extractive distillation column employed may be any type column or unit known to those skilled in the art to be useful in extractive distillation processes. Such columns may include trays or packing, and the like. The size of the column, of course, will depend upon the flow rates required and the degree of vinyl acetylene extraction desired or required and this, too, can be readily calculated. Conventional reboiling coils are employed in the bottom of the column to enhance separation in accordance with well known principles and practice. The advantages of this invention include the use of a small extractive distillation column.

The solvents employed in the vinyl acetylene extraction distillation column may include such well-known solvents as furfural, acetone, acetonitrile, dimethyl formamide, dioxane, beta, beta'-dichloroethyl ether (Chlorex), phenol, and the like. Normally, any of the polar solvents or mixture thereof which are ordinarily employed in extractive distillation of hydrocarbons may be used. Use of any of the known polar solvents containing small amounts of water, as about 1 to about 10 percent is well known. A suitable solvent is one which, although it dissolves butadiene and butene-2, under the operating conditions ordinarily employed will segregate, by more rapid absorption and/or better retention of, vinyl acetylene from butadiene or butene-2. Any solvent which in an extractive distillation operation retains at least a small portion of vinyl acetylene from a vinyl acetylene containing feed stream will be satisfactory.

A brief sequence of operations to illustrate the use of this invention is as follows. A butadiene containing feed from a sequence of previous fractionation and extractive distillation to concentrate the butadiene is fed into the final fractional distillation column. A side stream is drawn from the lower one-third of the fractional distillation column and fed into a vinyl acetylene extractive distillation column about midway of the column and near the top of the extractive distillation zone. The solvent is furfural containing 4% water. The overhead stream containing a lower concentration of vinyl acetylenes than the side stream feed is fed back into the fractional distillation column. The overhead product from the fractional distillation column is butadiene having a purity of greater than about 98.5% and a vinyl acetylene content of less than about 0.01%. The bottoms product from the vinyl acetylene solvent column may be passed to a stripper, the overhead from the stripper may be recycled to the dehydrogenation stage of the process, and the solvent recycled. The above-described process is also quite efficient when conducted with acetone or beta, beta'-dichloroethyl ether which also contain small amounts of water.

In practical operation, a $C_4$ hydrocarbon stream obtained by dehydrogenating butylenes is first fractionally distilled to provide a mixture consisting essentially of isobutylene, butene-1, butadiene-1,3, n-butane, trans-2-butene, cis-2-butene and vinyl acetylene. This mixture is subjected to extractive distillation using furfural containing 8% water as the solvent. Essentially all of the butadiene, and the vinyl acetylene, and some of the 2-butenes are absorbed by the furfural solvent, and the remainder of the $C_4$ hydrocarbons are removed as overhead. The butadiene-containing solvent is then fed to a solvent stripper which separates the $C_4$ hydrocarbons including vinyl acetylene from the solvent. As a final step, the overhead product from the solvent stripper is fed into a fractionating column. The 2-butenes and a portion of the vinyl acetylene comprise the bottoms product of this column, and butadiene with a purity of greater than 98% distills overhead and is collected.

The vinyl acetylene behaves in this system as though it had a boiling point intermediate between butadiene and trans-2-butene and is split between the overhead and bottoms products. It has already been pointed out that the vinyl acetylene in the fractional distillation column concentrates, usually on the trays below the center of the column, and in the practice of this invention, a small side stream is withdrawn from the column within this region of high concentration of vinyl acetylene. The side stream product may be extractively distilled in a small solvent tower containing wet furfural, and the overhead product, with reduced vinyl acetylene content, preferably with at least about 10% of the vinyl acetylenes removed, is returned to the fractional distillation column. By means of this removal of vinyl acetylene from the fractional distillation column, the overhead product therefrom, which is the high purity butadiene, has only minute traces of vinyl acetylene as an impurity, usually less than about 0.01% under good operating conditions.

It will be recognized that in different size and style fractional distillation columns, and under varying operating conditions in similar columns, that the point of maximum concentration of vinyl acetylene may vary from time to time in the lower portion of the fractional distillation column. It is contemplated and understood that the man skilled in the art will draw off the feed stream for the vinyl acetylene extractive distillation column at some point from the fractional distillation zone or column in the region where vinyl acetylene is concentrated at a point greater than the vinyl acetylene concentration of the feed stream to the fractional distillation column. Of course, optimum operating conditions will be obtained when the side stream draw off is at the point in the fractional distillation column where the vinyl acetylene content of the material in the column is greatest. It will be evident, of course, that draw off points outside this optimum concentration within the range of reasonable operating conditions will also be efficient in obtaining the desired results. Ordinarily, although experiment or calculation on a specific column will establish the point of optimum concentration of vinyl acetylenes for most efficient removal, under normal conditions, in a 150 tray fractional distillation column, draw off points between the 60th and 140th trays numbered down from the top of the column may be employed. Further, any point in the lower one-third of the column may be used if decreased efficiencies can be tolerated and in any case the vinyl acetylene concentration in the column will still be reduced.

An efficient vinyl acetylene solvent column for use in the novel process of this invention is a tower of about 2 to 3 feet inside diameter, 40 to 45 feet high with 12–20 trays with a conventional reboiler coil near the bottom. Of course, it will be recognized that the size of the column and number of trays may be varied depending upon the requirements of vinyl acetylene removal, and more efficient operations, if required, are obtained with a higher column, more trays and higher solvent flow rate. The actual operation of the column will depend, to some extent, upon the hydrocarbon reflux ratio, location of solvent entry, solvent temperature, solvent rate, location of hydrocarbon feed entry, hydrocarbon feed temperature and reboiler heat input, as are well known to those skilled in the art. Column pressure does not seem to be critical. In general, the design of the extractive distillation column is similar to straight fractionation columns with provisions made to handle greater liquid loads. Split-type trays are useful and the layout of caps, holddown bars, etc., should be such as to keep the hydraulic gradient at a minimum. In general, the solvent will be introduced near the top of the column. The amount of hydrocarbon reflux may be varied with generally accepted principles. The external reflux rate is generally set sufficiently high to hold solvent losses overhead to a minimum, and the solvent temperature is controlled to give the desired internal reflux. Normally, an increase in the ratio of solvent feed to hydrocarbon feed will improve the purity of the products and practical considerations of volume of material to be handled, and desired purity will regulate this factor. Normally, but not necessarily, the side stream drawn from the butadiene fractional distillation column will enter near the center of the vinyl acetylene solvent column, actually near the top of the affective extractive distillation zone. In normal operations, it has been generally found best to calculate a preset feed rate, ratio of solvent to feed, solvent temperature and external hydrocarbon reflux, and then adjust the heat input to the reboiler to give the desired degree of separation. Normally, the reboiler heat input is adjusted to give a desired material balance split of the hydrocarbon feed, since the ratio of solvent to feed and internal hydrocarbon reflux accomplish the desired separation.

The bottoms from the vinyl acetylene solvent column are normally first sent to a stripper to separate the absorbed hydrocarbons, including vinyl acetylene, a small amount of butadiene, butene-2 and the like, from the solvent and either destroying these materials or recycling back through the dehydrogenation units. The solvent itself is then recycled to the vinyl acetylene solvent tower. With many solvents, there is some buildup of polymeric material after continued use. This problem may be handled by conventional techniques. One method is to run the solvent until the polymeric buildup is objectionable and to then discard the solvent and replace with fresh material. A more economical method is to continuously withdraw a portion of the solvent, discard the same and replace with fresh solvent. A more economical and efficient method is to continuously distill at least a portion of the recovered solvent prior to recycling to remove objectionable impurities.

The purification system which is used to separate butadiene from other $C_4$ hydrocarbons derived by dehydrogenating butylenes involves three steps. In the first step a mixture consisting mainly of isobutylene, butene-1, butadiene, normal butane, trans-2-butene, and cis-2-butene is fed to a fractional distillation column. In addition to the above named compounds, a number of other compounds are present in quite small percentages. Among these is vinyl acetylene. The function of the first column is to distill overhead essentially all of the butadiene while at the same time minimizing the amounts of the heavier materials, normal butane, trans-2-butene, and cis-2-butene appearing in overhead. Nevertheless, appreciable amounts of these last three named compounds do appear in the overhead inasmuch as the column is designed primarily to prevent the inclusion of butadiene in the bottoms product, and not to produce an overhead product free of normal butane, trans-2-butene and cis-2-butene. Essentially all of the vinyl acetylene distills overhead in the column and thus, appears with the butadiene. The second step involves extractive distillation using a furfural-water mixture as the solvent in a column. Primary function of this step is to separate isobutylene, butene-1, and normal butane from the butadiene. In so doing, part of the two butene-2 isomers distill overhead with the isobutylene, butene-1, and normal butane. Essentially all of the butadiene and part of the cis- and trans-2-butene are absorbed by the furfural-water solvent. Also, essentially all of the vinyl acetylene is absorbed by the solvent. The hydrocarbon-containing solvent is then fed to a solvent stripper which separates the $C_4$ hydrocarbons from the solvent. In the final step in the butadiene purification, the solvent stripper overhead product is fed to an ordinary fractionation column, in which butadiene with a purity of 98% or higher distills overhead. Small amounts of trans-2-butene and other $C_4$ hydrocarbons appear as impurities in the butadiene stream. Nearly all of the cis- and trans-2-butene fed to this column and a very small amount of butadiene comprise the column bottoms product stream. The vinyl acetylene which, as previously pointed out, behaves as though it boils intermediate between butadiene and trans-2-butene, appears in measurable quantities in both the overhead and bottoms product.

In one embodiment of this invention, the additional steps of this invention are integrated in this sequence of operations to produce butadiene of low vinyl acetylene content. A stream containing about 78% butadiene, 10% low boiling butene-2, 12.1% high boiling butene-2 and 0.045% vinyl acetylene obtained from a furfural extractive distillation unit, is fed into the fractional distillation column which is 12 feet in diameter and contains 150 trays, at a flow rate of 250 barrels per hour. The pressure at the top of this column is 80 p.s.i.g., the overhead vapor temperature is 125° F., the reflux temperature is 95° F., the hydrocarbon feed temperature is 80° F. and the bottoms temperature is 150° F. The net overhead product from this column is 200 barrels per hour of butadiene having a purity greater than 98.5%. The reflux ratio is varied as desired. A vinyl acetylene extractive distillation tower 43 feet high, 2½ foot inside diameter tower with 16 trays is provided. A side stream from the 110th tray of the fractional distillation column is fed to this tower at a flow rate of 50 barrels per hour. The top column pressure is 60 p.s.i.g., the overhead vapor temperature is 110° F., the reflux temperature is 95° F. The solvent has a feed temperature of 105° F., and a composition of 93 volume percent furfural and 7 volume percent water. The feed stream temperature from the side draw of the fractional distillation column is 170° F. and the bottoms temperature of the column is 293° F. The solvent feed to this column is at a rate of 125 barrels per hour, the reflux is 20 barrels per hour, the net overhead product is 48 barrels per hour returned to the fractional distillation column, and the bottoms product on a solvent-free basis is 2 barrels per hour. The vinyl acetylene content of the side draw from the fractional distillation column feed to the vinyl acetylene solvent column is about 1 mole percent vinyl acetylene and the vinyl acetylene solvent column overhead return to the fractional distillation column is about 0.8 mole percent vinyl acetylene. The solvent tower bottoms contain 5 mole percent vinyl acetylene on a solvent-free basis. After this system is in operating equilibrium and on a continuous basis, the overhead butadiene contains about 0.006 mole percent vinyl acetylene, as compared to vinyl acetylene contents of as high as 0.1 or higher mole percent in butadiene from the fractional distillation column when not treated in accordance with the novel and improved process of this invention. The vinyl acetylene solvent column is topped with a 7-tray fractionating section to prevent furfural from going overhead.

Material balance for technical operation above is as follows: the feed to the vinyl acetylene extractive distillation column contains 28.62 volume percent low boiling butene-2, 22.26 volume percent high boiling butene-2, 48.12 volume percent butadiene and 1 volume percent vinyl acetylene. The overhead product from this column contains 29.01 volume percent low boiling butene-2, 22.39 volume percent high boiling butene-2, 47.73 volume percent butadiene and 0.8 volume percent vinyl acetylene. The bottoms product on a furfural-free basis is 18.03 volume percent of low boiling butene-2, 18.60 volume percent of high boiling butene-2, 58.92 volume percent butadiene and 4.65 volume percent vinyl acetylene. The bottoms product is recirculated back to the dehydrogenating units for further processing after stripping.

In another embodiment of the invention, in a vinyl acetylene solvent tower, 2½ feet in diameter and 48 feet high, having 16 trays spaced 30 inches apart, operating at a reflux rate of 28.9 barrels per hour, a solvent flow rate of 123 barrels per hour and with other operating conditions equivalent to those outlined above, similar excellent results are obtained.

As has been pointed out above, the vinyl acetylene concentrated in the lower portion of the fractional distillation column in operations not employing the improved process of this invention, can reach as high as 25%. However, when the process of this invention is employed, these high concentrations are not reached, and the vinyl acetylene content of the column is kept at a low figure. It is possible, therefore, to operate the vinyl acetylene solvent column, both intermittently and on a continuous basis, as desired or required. Normally, better results are obtained, of course, when continuous operations are employed and smaller equipment and lesser volume feed streams of solvent and product from the fractional distillation column may be employed with attendant advantages in lower equipment investment and ease of operations. It is contemplated that recovered solvent from the extractive distillation process in production operations for purifying butadiene-containing hydrocarbon streams can be diverted to the vinyl acetylene solvent column. As is apparent, operating conditions can be varied readily by those skilled in the art to meet the requirements of purity and material balance as desired and/or required.

Under operating conditions such that the bottoms product from a fractional distillation column contain appreciable amounts of vinyl acetylene, the bottoms product stream could be fed to an extractive distillation column as described, and the vinyl acetylene removed therein. This operation would substantially reduce the vinyl acetylene content of the C₄ hydrocarbons in the fractional distillation column if done on a continuous or semi-continuous basis since, with such removal, the distribution of vinyl acetylene in the lower portion of the fractional distillation column would be substantially affected with subsequent lowering of the vinyl acetylene content of the C₄ hydrocarbons nearer the top of the fractional distillation column.

The side stream draw may be either a liquid or vapor stream, it being usually advantageous to supply a vapor feed to the vinyl acetylene solvent column. Although not essential the side stream is usually heated to about 170°

F. The overhead product from the vinyl acetylene solvent column is fed back into the fractional distillation column as a liquid or vapor stream, preferably vapor. The overhead stream from the vinyl acetylene solvent column being fed back to the fractional distillation column may contain appreciable quantities of vinyl acetylene so long as the vinyl acetylene solvent column is continuously removing some of the vinyl acetylene absorbed in the solvent, such that the overhead product from the fractional distillation column is at the desired low level.

It has been found that the most efficient use of this invention is made when the system is operating to remove sufficient vinyl acetylene from the side stream in the vinyl acetylene extractive distillation column to maintain a vinyl acetylene content in the zone of maximum vinyl acetylene concentration in the fractional distillation column of less than about 5% and, more preferably, less than 2%. A preferred range of vinyl acetylene content in the fractional distillation column at the point of maximum concentration is from about one-half to about two percent vinyl acetylene, and in this range, the vinyl acetylete content of the high purity butadiene in the overhead from the fractional distillation column will be less than about 0.02%. When the maximum concentration of vinyl acetylene in the fractional distillation column is about 1% or less, the vinyl acetylene content of the butadiene overhead will be less than about 0.01%. As has been shown before, in continuous operation, so long as some vinyl acetylene is removed from the side stream, preferably greater than about 10% thereof, the advantages of this invention will be obtained.

More efficient removal of vinyl acetylene in the vinyl acetylene column can be obtained by employing large diameter towers and on taller towers with additional trays. Under otherwise constant conditions, with a larger vinyl acetylene column, larger volumes of solvent may be employed and more efficient removal of vinyl acetylene is obtained. Likewise, in such larger equipment, a larger volume of side stream may be treated. Of course, it will be recognized by the man skilled in the art that for economical and processing reasons, the smallest extractive distillation column consistent with efficient operations will be employed so that less expense and equipment is involved and smaller volumes of side stream material will be required to be handled. It will also be understood that the bottoms product from the vinyl acetylene extractive distillation column desirably will contain minimum amounts of butadiene so as to decrease potential loss of butadiene. This is particularly important if this bottoms product is discarded or burned and is of some importance if the bottoms product is recycled through the dehydrogenation system, since some of the butadiene will be destroyed in such reprocessing.

The advantages of this invention are realized by means of a small and inexpensive extractive distillation column and relatively low solvent flow rates to treat a small stream portion of the total end product to provide an improved butadiene product containing only a few parts per million of vinyl acetylene. The butadiene-containing stream fed to the fractional distillation column normally will contain more than about 25% butadiene but may contain lesser amounts of butadiene. This process is readily adapted to other sequences and methods of preparing and purifying butadiene to decrease the vinyl acetylene content of the butadiene. One of the advantages of this invention is that usually it is not necessary to treat the total butadiene-containing stream to reduce the vinyl acetylene content of the final high purity butadiene product and, normally, less than about one-half, preferably less than about one-third of the total hydrocarbon feed to the final fractional distillation zone will be withdrawn as a side stream to be treated to remove vinyl acetylene therefrom. This process is readily adapted to other sequences and methods of preparing and purifying butadiene to decrease the vinyl acetylene content of the butadiene. Likewise, the procedure is readily applied to other unsaturated hydrocarbons and in particular, conjugated dienes such as isoprene.

I claim:

1. A method for preparing high purity butadiene containing a small amount of vinyl acetylene which comprises fractionally distilling in a fractional distillation zone a mixture of hydrocarbons containing a substantial portion of butadiene and vinyl acetylene as an impurity, withdrawing a side stream from said fractional distillation zone of said hydrocarbon mixture containing a higher concentration of vinyl acetylene than the vinyl acetylene content of the total hydrocarbon mixture being fractionally distilled, extractively distilling said side stream with a polar solvent for the vinyl acetylene under conditions such that at least a portion of said vinyl acetylene is extracted from the hydrocarbon mixture, and returning the overhead, which is the extractively distilled hydrocarbon mixture, containing reduced vinyl acetylene to said fractional distillation zone and removing the butadiene-1,3 overhead from said fractional distillation zone.

2. The method of claim 1 wherein the polar solvent is furfural.

3. A method for preparing high purity butadiene-1,3 containing less than 0.01% vinyl acetylene which comprises while fractionally distilling in a fractional distillation column a mixture of $C_4$ hydrocarbons containing a substantial portion of butadiene-1,3 and vinyl acetylene as an impurity, continuously withdrawing a side stream from the lower one-half of said fractional distillation column of said $C_4$ hydrocarbon mixture, which side stream contains vinyl acetylenes concentrated therein, extractively distilling said side stream with a polar solvent which is selective for vinyl acetylene under conditions such that about 10% of the vinyl acetylene is removed from said hydrocarbon mixture, returning the overhead, which is the extractively distilled $C_4$ hydrocarbon mixture, to said fractional distillation column and removing the butadiene-1,3 overhead from said fractional distillation column.

4. The method of claim 3 wherein the side stream contains no greater than about one percent vinyl acetylene based on the weight of the side stream, more than 10% of the vinyl acetylene in the side stream is removed from the side stream and the polar solvent is furfural containing about 3 to 10 percent water.

5. A method for preparing high purity butadiene containing a minimum amount of vinyl acetylene which comprises while fractionally distilling in a fractional distillation zone a mixture of hydrocarbons containing a substantial portion of butadiene and vinyl acetylene as an impurity, withdrawing a side stream from said fractional distillation zone of said hydrocarbon mixture containing a higher concentration of vinyl acetylene than the vinyl acetylene content of the total hydrocarbon mixture being fractionally distilled, extractively distilling said side stream with a polar solvent for the vinyl acetylene under conditions such that at least a portion of said vinyl acetylene is removed from the hydrocarbon mixture so as to maintain a vinyl acetylene content in the zone of highest vinyl acetylene concentration in said fractional distillation zone of less than about 5%, and returning the overhead, which is the extractively distilled hydrocarbon mixture, to said fractional distillation zone and removing the butadiene-1,3 overhead from said fractional distillation zone.

6. The method of claim 5 wherein the polar solvent is furfural containing water, and the vinyl acetylene concentration in the fractional distillation zone is maintained at not greater than about one percent.

7. In a process for purifying butadiene which comprises first fractionating a butadiene-containing mixture of hydrocarbons to concentrate said butadiene, extractively distilling the resulting concentrated butadiene-containing mixture and finally fractionally distilling the extractively distilled butadiene-containing concentrate in a fractional distillation zone to isolate butadiene, the improvement which comprises removing vinyl acetylene from said butadiene-containing mixture of hydrocarbons by withdrawing a side stream of hydrocarbons from the last-mentioned fractional distillation step at a point in said fractional distillation zone at which the vinyl acetylene content of the hydrocarbon mixture is greater than the vinyl acetylene content of the total extractively distilled butadiene-containing concentrate being fractionally distilled, extractively distilling said side stream with a polar solvent for the vinyl acetylene under conditions such that at least a portion of the vinyl acetylene in said side stream is removed, and returning the overhead, which is the extractively distilled butadiene-containing hydrocarbon mixture, to said fractional distillation zone.

8. The process of claim 7 wherein the polar solvent is furfural.

9. In a process for purifying butadiene which comprises separating said butadiene from a mixture of $C_4$ hydrocarbons containing butadiene and vinyl acetylene, including the steps of fractionating the $C_4$ hydrocarbon mixture to concentrate said butadiene, extractively distilling the resulting butadiene concentrate and then fractionally distilling the extractively distilled butadiene concentrate in a fractional distillation zone to isolate butadiene, the improvement which comprises drawing off a side stream of $C_4$ hydrocarbons from the last-mentioned fractional distillation zone at a point in said fractional distillation zone at which the vinyl acetylene content of the $C_4$ hydrocarbon mixture is greater than about 0.1%, extractively distilling said side stream with a polar solvent for the vinyl acetylene under conditions such that at least 10% of the vinyl acetylene in said side stream is removed, dissolved in said polar solvent, and returning the overhead, which is the extractively distilled $C_4$ hydrocarbon mixture, to said fractional distillation zone.

10. The process of claim 9 wherein the polar solvent is furfural containing about 3 to 10 percent water.

References Cited in the file of this patent

UNITED STATES PATENTS

| | | |
|---|---|---|
| 2,180,386 | Balcar | Nov. 21, 1939 |
| 2,356,986 | Frey | Aug. 29, 1944 |
| 2,357,344 | Morris et al. | Sept. 5, 1944 |
| 2,363,527 | Horsley | Nov. 28, 1944 |
| 2,365,898 | Morris et al. | Dec. 26, 1944 |
| 2,382,603 | Buell | Aug. 14, 1945 |
| 2,415,006 | Hachmuth | Jan. 28, 1947 |
| 2,806,816 | Staib et al. | Sept. 17, 1957 |
| 2,865,818 | Hawkins et al. | Dec. 23, 1958 |
| 2,910,412 | Muller et al. | Oct. 27, 1959 |